March 3, 1931.  P. D. SHOENBERGER  1,794,989
RELIEF VALVE
Filed June 14, 1926
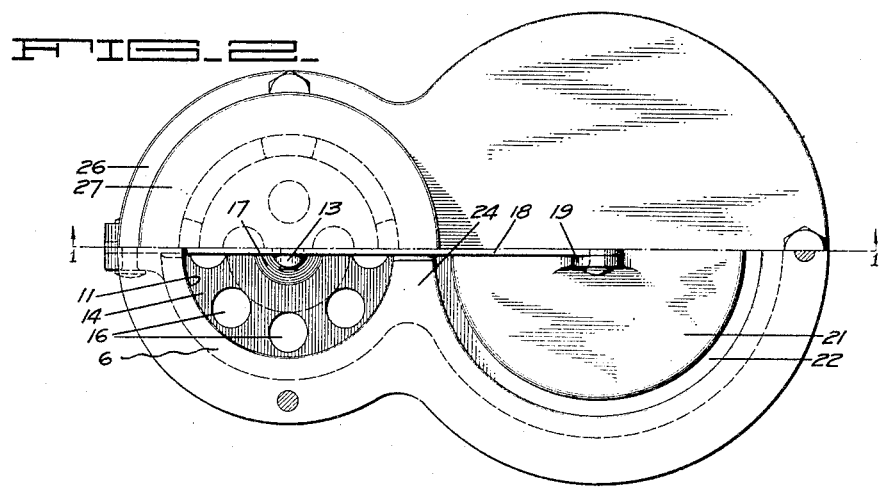
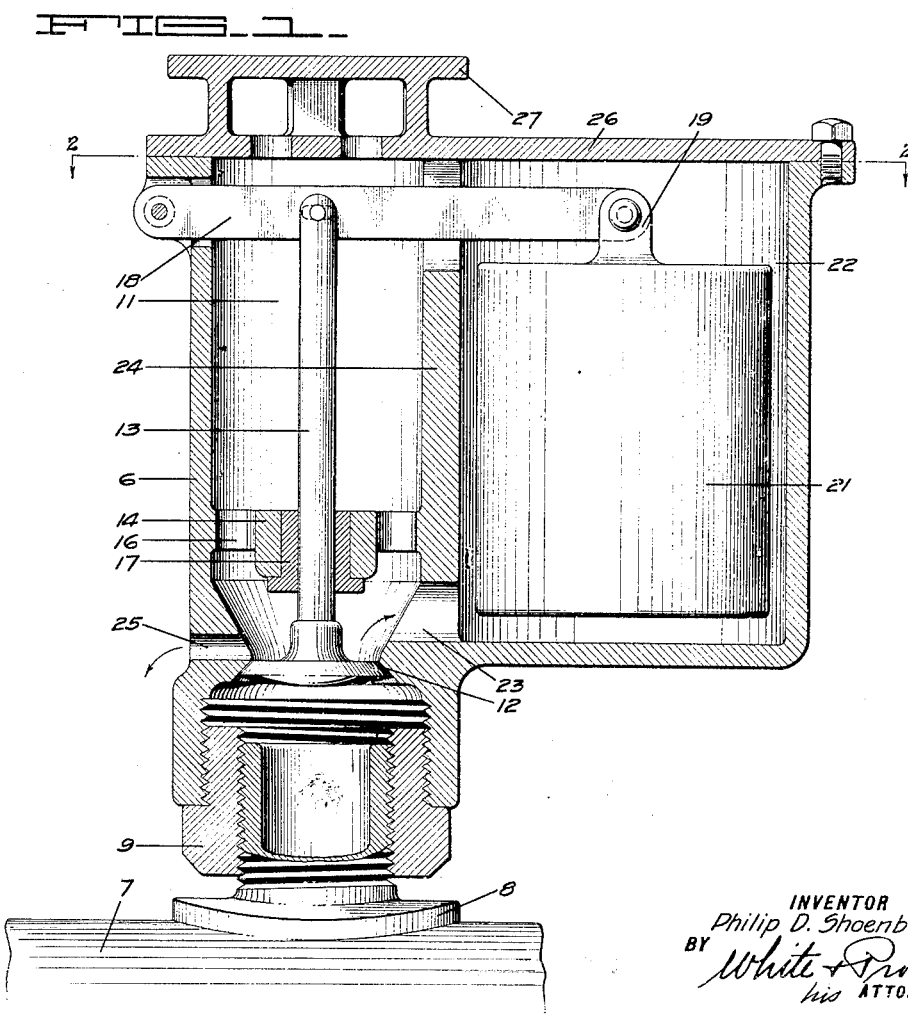
INVENTOR
Philip D. Shoenberger
BY White & Prost
his ATTORNEYS Patented Mar. 3, 1931

1,794,989

UNITED STATES PATENT OFFICE

PHILIP D. SHOENBERGER, OF SAN MATEO, CALIFORNIA, ASSIGNOR TO WESTERN PIPE & STEEL COMPANY OF CALIFORNIA, OF SAN FRANCISCO, CALIFORNIA, A CORPORATION OF CALIFORNIA

RELIEF VALVE

Application filed June 14, 1926. Serial No. 115,834.

My invention relates to valves for use especially in releasing air or other gases from pipes carrying liquid under pressure.

An object of my invention is to provide a relief valve which will permit the escape of all of the air or gas from a pipe line but which will preclude the escape of substanial quantities of liquid.

Another object of my invention is to provide a relief valve which may be operated from a remote point simply by reducing the pressure in the pipe line on which the relief valve is installed.

A further object of the invention is to provide a relief valve in which the working parts are not exposed to any possibly deleterious chemical action of the liquid carried in the pipe line to which the relief valve is attached.

The invention possesses other advantageous features, some of which with the foregoing, will be set forth at length in the following description where I shall outline in full that form of the relief valve of my invention which I have selected for illustration in the drawings accompanying and forming part of the present specification. In said drawings I have shown one form of the relief valve embodying my invention, but it is to be understood that I do not limit myself to such form since the invention, as set forth in the claims, may be embodied in a plurality of forms.

In the drawings:

Fig. 1 is a transverse section of the relief valve of my invention as it is installed on a pipe line carrying fluid under pressure, the plane of section being indicated by the line 1—1 of Fig. 2.

Fig. 2 is, in the upper half, a plan view of the assembled relief valve, and, in the lower half, a plan of the relief valve with the cover removed.

The relief valve of my invention is designed to be installed in pipe lines carrying liquids under pressure and in which unwanted quantities of air or other gas are present. The gas, which henceforth will be referred to as air, collects at the high points of the pipe line and my valve is intended to be installed at those points. In pipe lines which are relatively short and which have but one high point or summit, it will usually be necessary to install but a single relief valve, but in the case of relatively longer pipe lines which are undulatory and which include a plurality of summits, it is considered desirable to install at least one of the relief valves at each summit. The valve of my invention is constructed to function semi-automatically, that is, its operation may be initiated from a remote point. It may be made to permit the escape of locally collected air from a liquid line solely by momentarily dropping the pressure in the line and subsequently allowing it to increase to its former value. This feature becomes of particular value when a number of relief valves are installed in a lengthy pipe line, as the entire line may be freed from air by dropping the pressure to a low value for an instant and later allowing it to return to its normal value.

The relief valve of my invention preferably comprises a valve which, when closed, is maintained in closed position by the pressure existing in the pipe to which it is attached, and which is initially closed by means of a float rendered non-buoyant after the closure of the valve.

The means for accomplishing the desired results are preferably embodied in a valve body 6 which is suitably mounted on a high point of a pipe line 7 by means of a flanged connection 8. The connection 8 is suitably affixed to the pipe line 7 in any convenient manner and carries in threaded engagement at its upper end a bushing 9. The lower end of the valve body 6 is suitably bored and threaded to engage the bushing 9 and is thereby supported on the pipe line 7.

A passage or conduit 11, extends from the connection 8 upwardly thru the valve body 6. The conduit 11 is restricted just above the bushing 9 to form a valve seat 12. A poppet valve 13 is mounted in the valve body by means of a transverse partition 14 extending across the conduit 11. The partition 14 is provided with a suitable number of apertures 16 to permit free communication therethru and is provided at its center with a bushing 17 thru which the stem of the valve 13 passes. The valve 13 is thereby supported within the valve body 6 and is free to move within the bushing to become unseated or seated on the valve seat 12. The upper end of the valve stem is affixed by means of a pin to a link 18 which at one end, is pivoted to one side of the valve body. The other end of the link 18 is attached by a pin to ears 19 forming part of a float 21.

The float 21 is enclosed in a float chamber 22 which is a part of the valve body 6. The float may be made of any suitable buoyant material such as cork, but is preferably made of metal formed into a hollow cylinder and which is treated, as by galvanizing, to make it resistant to corrosion and rust. A passage 23 is formed in the wall 24 which separates the conduit 11 from the float chamber 22 in order to permit free communication between the conduit and the float chamber. An outlet or liquid drain 25 of restricted area is pierced thru the outer wall of the valve body 6.

The upper ends of the conduit 11 and of the float chamber 22 are closed by a suitable cap 26 which is bolted to the upper end of the valve body. The cap is apertured to give communication to the atmosphere from the interior of the valve body and is provided with a suitable protecting shield 27 which prevents the ready entrance of foreign matter to the interior of the valve body.

In describing the operation of my relief valve as it is installed at the summit of a pipe line which carries fluid under pressure, it will be assumed that the pipe line has been empty of liquid and that water is being admitted to the pipe line and is gradually approaching the summit thereof. The entering water crowds the air contained in the pipe line toward the high point at which the relief valve is installed. Under the described conditions, the combined weight of the float 21, of the link 18 and of the valve 13 keeps the valve from seating on the valve seat 12 and allows a free passage from the interior of the pipe 7 thru the connection 8, the bushing 9 and the conduit 11 to the atmosphere. The air which is being displaced in the pipe line by the entering water is consequently perfectly free to pass thru the open valve 13 and escape to the atmosphere.

The valve 13 remains open and the air continues to escape to the atmosphere until the air is all discharged and the liquid rises past the valve 13 and flows thru the opening 23 into the float chamber 22. The buoyancy of the float 21 causes it to respond to the rising level of liquid and operate thru the link 18 to lift the valve 13 onto the valve seat 12 and shut off communication between the interior of the pipe 7 and the atmosphere. As soon as the valve 13 is closed, the pressure within the pipe 7 rises and serves to maintain the valve 13 on its seat. When the valve 13 is closed, no further supply of liquid enters the float chamber 22 and the liquid is free to flow from the float chamber and from the conduit 11 thru the restricted drain 25. It therefore occurs that shortly after the closure of the valve 13, the liquid which has been effective in closing the valve is permitted to escape and leave the interior of the valve body entirely free from liquid. The buoyancy of the float is no longer effective and the weight of the float, link 18, and of the valve itself tends to open the valve, but ordinarily the pressure within the pipe line is ample to maintain the valve in its seated position.

The liquid drain 25 which permits the liquid to drain from the interior of the valve body is of such a size that during the influx of liquid to the float chamber there is no appreciable escape while drainage of the liquid from the interior of the valve body occupies but a short time after the valve has been closed. It is particularly advantageous to permit the withdrawal or escape of the liquid, which is usually water, from the interior of the valve body since then the parts which are normally exposed to the liquid are exposed but momentarily and at long intervals and are but little subject to rust and other chemical actions consequent upon the chemical nature of the liquid.

When it is desired to clear the pipe line of whatver air may have accumulated after it has been intitially freed, it is only necessary to allow the pressure of the line to fall momentarily to a certain low value. When the pressure has dropped sufficiently, the weight of the float and linkage opens the valve 13 and permits the accumulated air to escape to the atmosphere. Upon the restoration of the pressure to the pipe line, the liquid again rushes past the valve into the float chamber and closes the valve in the manner described previously. It is intended that the pivoting points on the link 18 and the sizes and materials of the valve, link and float will be so chosen that they will open the valve at whatever low pressure is considered desirable.

I claim:

1. A relief valve for attachment to a source of fluid under pressure comprising a valve body including a float chamber, a conduit connecting said float chamber to said source of fluid under pressure, a valve controlling the flow of fluid thru said conduit, a float in said float chamber and responsive to the level of liquid therein, linkage connecting said float to said valve whereby upward movement of said float closes said valve, said float normally biasing said valve to open position upon closure of said valve, and a restricted outlet from said float chamber permitting liquid to drain therefrom and away from said source of fluid.

2. A relief valve for attachment to a source of fluid under pressure comprising a valve body including a float chamber, a conduit connecting said float chamber to said source of fluid under pressure, a valve controlling the flow of fluid thru said conduit, a float in said float chamber and responsive to the level of liquid therein, linkage connecting said float to said valve whereby upward movement of said float closes said valve, and means for rendering the float non-buoyant after closure of the valve.

In testimony whereof, I have hereunto set my hand.

PHILIP D. SHOENBERGER.